United States Patent Office 3,836,548
Patented Sept. 17, 1974

3,836,548
PROCESS FOR THE MANUFACTURE OF ANTHRAQUINONE DERIVATIVES
Maurice Grelat, Bettingen, and Jean Archambault, Basel, Switzerland, assignors to Ciba-Geigy AG, Basel, Switzerland
No Drawing. Filed June 17, 1971, Ser. No. 154,169
Claims priority, application Switzerland, June 24, 1970, 9,546/70
Int. Cl. C09b 1/16, 1/20
U.S. Cl. 260—376
2 Claims

ABSTRACT OF THE DISCLOSURE 1-amino-2-hydroxymethyl-anthraquinone is oxidised to give 1-amino-anthraquinone-2-carboxylic acid.

---

The present invention relates to a process for the oxidative manufacture of α-amino-anthraquinones which possess a carboxyl group in the β-position, and the process is characterised in that appropriate α-amino-anthraquinones which possess a hydroxymethyl group in the β-position are treated with suitable oxidising agents.

The invention relates, in particular, to a process for the manufacture of 1-amino-anthraquinone-2-carboxylic acid by treatment of 1-amino-2-hydroxymethyl-anthraquinone with siutable oxidising agents.

Possible oxidising agents are above all permanganates, such as, for example, the alkali salts of the permanganates.

The reaction is appropriately carried out in the presence of an alkaline agent, and for this purpose alkali hydroxides or alkali carbonates are, for example, used, especially if a solvent which reacts basic is not present.

The oxidising agents are advantageously used in a dissolved form, and in particular in organic solution, but above all in aqueous-organic solution.

Suitable solvents resistant to oxidation and alkali are perchloroethylene, trichloroethylene, methyl ethyl ketone, preferably solvents which are miscible with water such as dioxane, ω,ω' - dimethoxydiethyl - ether, dimethylformamide, dimethylacetamide and N-methylpyridone, and above all solvents which react basic, such as pyridine, as well as ethers and ketones, such as dioxane, ω,ω'-dimethoxydiethyl-ether, acetone and methyl ethyl ketone.

Preferably, aqueous-organic solutions which contain 0 to 60%, preferably 10 to 50%, of water are used. The addition of water is not necessary if the solvents dissolve a sufficient amount of the oxidising agent.

The oxidation can already be carried out at room temperature. It is however advantageosuly carried out at higher temperatures, such as 30 to 180° C., preferably 50 to 140° C.

The present products are valuable intermediate products for the manufacture of vat, pigment and dispersion dyestuffs.

In the examples which follow the parts, unless otherwise stated, denote parts by weight and the percentages denote percentages by weight.

EXAMPLE 1

10 parts of 1 - amino-3-hydroxymethyl-anthraquinone, 100 parts of 5% strength sodium hydroxide solution and 10 parts of potassium permanganate are stirred for 5 hours at 20 to 50° C. 1 part of potassium premanganate is further added to the mixture, which is stirred for a further 10 hours at 20 to 25° C. After adding 300 parts of water, the reaction mixture is warmed to 80–85° C., and the manganese dioxide formed is filtered off hot. The alkaline solution of the 1-amino-anthraquinone-2-carboxylic acid is acidified with 10% strength hydrochloric acid, and the parcipitated aminocarboxylic acid is filtered off, washed with water until neutral and dried. 1-amino-anthraquinone-2-carboxylic acid is obtained in good yield.

EXAMPLE 2

10 parts of 1-amino-2-hydroxymethyl-anthraquinone are dissolved in 100 parts of pyridine at 80° C. 20 parts of a 10% strength sodium carbonate solution are added thereto, and 5 parts of potassium permanganate are added at 60 to 70° C. The mixture is stirred for 30 minutes at 60 to 70° C. and 3 parts of potassium permanganate are then added thereto, followed by a further 2 parts of potassium permanganate after 2 hours. The temperature is raised to 75–80° C. over the course of one hour, and the mixture is stirred at this temperature for 3 hours. After adding 30 parts of 10% strength sodium carbonate solution, the reaction mixture is then steam-distilled until no pyridine is detectable in the residue. The manganese dioxide is filtered off hot, the filtrate is acidified with hydrochloric acid, and the precipitated 1-amino-anthraquinone-2-carboxylic acid is filtered off, washed with water until neutral and dried. Yield: 85%. Melting point 285 to 288° C.

The same reaction can also be carried out at 20 to 25° C.; the yield however becomes somewhat worse.

EXAMPLE 3

10 parts of 1-amino-2-hydroxymethyl-anthraquinone, 120 parts of methyl ethyl ketone, 20 parts of sodium carbonate and 3.5 parts of potassium permanganate are stirred for 30 minutes at 75° C. A further 6 parts of permanganate are gradually added over the course of 3 hours, and the mixture is stirred for a further 3 hours at 75 to 80° C. The 1-amino-anthraquinone-2-carboxylic acid formed is isolated as described in Example 2.

Instead of methyl ethyl ketone, dimethylformamide, dimethylacetamide and N-methylpyrrolidone can also be used.

What we claim is:
1. A process for the manufacture of 1-amino-anthraquinone-2-carboxylic acid, wherein an alkaline solution of 1 - amino - 2-hydroxymethyl-anthraquinone is treated with alkali metal permanganate, and wherein the solvent is an organic solvent resistant to oxidation and alkali, or a mixture thereof with water.
2. A process of claim 1 wherein the solvent is a mixture of pyridine and water.

References Cited

UNITED STATES PATENTS 3,562,299   2/1971   Harvey _____ 260—376

FOREIGN PATENTS 263,587   6/1970   U.S.S.R. _____ 260—524 M

OTHER REFERENCES

Groggins, Unit Processes in Org. Synthesis, p. 417 (1952).

Wagner et al., Synthetic Organic Chemistry, p. 419 (1953).

LORRAINE A. WEINBERGER, Primary Examiner

E. J. SKELLY, Assistant Examiner